United States Patent
Yamaura et al.

(10) Patent No.: US 7,896,637 B2
(45) Date of Patent: Mar. 1, 2011

(54) INJECTION MOLDING MACHINE

(75) Inventors: Hiroshi Yamaura, Nagano-ken (JP);
Yoshimoto Unno, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 0 days.

(21) Appl. No.: 11/516,544

(22) Filed: Sep. 7, 2006

(65) Prior Publication Data

US 2007/0054007 A1    Mar. 8, 2007

(30) Foreign Application Priority Data

Sep. 8, 2005   (JP) ................. 2005-260216

(51) Int. Cl.
*B29C 45/77*   (2006.01)

(52) U.S. Cl. ......... 425/150; 425/135; 425/145; 425/556; 425/582; 425/583; 425/587; 425/590; 264/40.5; 264/40.7; 264/211.21; 60/428; 60/486

(58) Field of Classification Search ............ 425/582, 425/583, 587, 595, 145, 149, 150, 556, 135, 425/589, 590; 264/40.1, 40.5, 40.7, 211.21, 264/328.1; 60/327, 421, 428, 486
See application file for complete search history.

(56) References Cited

U.S. PATENT DOCUMENTS

| | | | | |
|---|---|---|---|---|
| 3,872,887 | A * | 3/1975 | Wohlrab | 137/565.33 |
| 3,894,824 | A * | 7/1975 | Wells | 425/146 |
| 4,047,871 | A * | 9/1977 | Hehl | 425/450.1 |
| 4,712,991 | A * | 12/1987 | Hehl | 425/145 |
| 5,232,714 | A * | 8/1993 | Kohno et al. | 425/145 |
| 5,443,587 | A * | 8/1995 | Takizawa | 417/222.1 |
| 5,443,782 | A * | 8/1995 | Nakamura et al. | 264/328.1 |
| 5,474,733 | A * | 12/1995 | Koide et al. | 264/328.1 |
| 5,482,662 | A * | 1/1996 | Nakamura et al. | 264/40.1 |
| 5,585,053 | A * | 12/1996 | Arai | 264/40.1 |
| 5,756,019 | A * | 5/1998 | Nakazawa et al. | 264/40.5 |
| 5,814,251 | A * | 9/1998 | Arai et al. | 264/40.1 |
| 6,062,843 | A * | 5/2000 | Yamaura | 425/136 |
| 6,077,064 | A * | 6/2000 | Graetz et al. | 425/192 R |
| 6,120,711 | A * | 9/2000 | Takizawa | 264/40.1 |
| 6,183,682 | B1 * | 2/2001 | Shimizu et al. | 264/328.1 |
| 6,244,831 | B1 * | 6/2001 | Kawabata et al. | 417/213 |
| 6,257,859 | B1 * | 7/2001 | Koda et al. | 425/145 |
| 6,333,611 | B1 * | 12/2001 | Shibuya et al. | 318/370 |
| 6,341,953 | B1 * | 1/2002 | Okubo et al. | 425/145 |
| 6,376,940 | B1 * | 4/2002 | Shibuya et al. | 310/12 |

(Continued)

FOREIGN PATENT DOCUMENTS

JP   08233136   * 9/1996

(Continued)

*Primary Examiner* — Joseph S Del Sole
*Assistant Examiner* — Seyed Masoud Malekzadeh
(74) *Attorney, Agent, or Firm* — Birch, Stewart, Kolasch & Birch, LLP

(57) ABSTRACT

When constructing an injection molding machine M that is equipped with hydraulic pumps 2, which control discharge flow rates by variably controlling the number of revolutions of a drive motor 3, and that drives hydraulic actuators 4a... by these hydraulic pumps 2; the injection molding machine M is equipped with a hydraulic drive member 6 having multiple hydraulic pumps 2p and 2q, and a hydraulic oil supply circuit 5 jointly or individually supplying hydraulic oil to be discharged from multiple hydraulic pumps 2p and 2q to a hydraulic actuator 4a, 4b, 4c, 4d or 4e selected from the multiple hydraulic actuators 4a....

6 Claims, 6 Drawing Sheets

U.S. PATENT DOCUMENTS

| | | | | |
|---|---|---|---|---|
| 6,461,139 B1* | 10/2002 | Yokoya et al. | | 425/149 |
| 6,477,837 B2* | 11/2002 | Kogane et al. | | 60/428 |
| 7,128,549 B2* | 10/2006 | Terada | | 425/143 |
| 7,176,648 B2* | 2/2007 | Choi | | 318/625 |
| 2002/0031567 A1* | 3/2002 | Magario | | 425/135 |
| 2003/0042640 A1* | 3/2003 | Kubota | | 264/40.1 |
| 2003/0090019 A1* | 5/2003 | Amano | | 264/40.5 |
| 2003/0230830 A1* | 12/2003 | Terada | | 264/328.1 |
| 2004/0071815 A1* | 4/2004 | Chen | | 425/556 |
| 2005/0053685 A1* | 3/2005 | Nagaya et al. | | 425/149 |
| 2005/0258795 A1* | 11/2005 | Choi | | 318/625 |

FOREIGN PATENT DOCUMENTS

| | | | |
|---|---|---|---|
| JP | 08233136 A | * | 9/1996 |
| JP | 08276483 A | * | 10/1996 |
| JP | 10-244572 | * | 9/1998 |
| JP | 10244572 A | * | 9/1998 |
| JP | 11105094 A | * | 4/1999 |
| JP | 3245707 B2 | | 11/2001 |
| JP | 2003-21105 | * | 1/2003 |
| JP | 2003021105 A | * | 1/2003 |

* cited by examiner

INJECTION MOLDING MACHINE

BACKGROUND OF THE INVENTION

1. Field of the Invention

The present invention relates to an injection molding machine driving hydraulic actuators by hydraulic pumps, which control discharge flow rates by variably controlling the number of revolutions of a drive motor.

2. Description of the Relevant Art

Conventionally, an injection molding machine that is equipped with a hydraulic pump controlling a discharge flow rate by variably controlling the number of revolutions of a drive motor, and that drives a hydraulic actuator, such as an injecting cylinder (hydraulic cylinder), by the hydraulic pump is known in Japanese Patent Publication No. 3245707.

The objective of the injection molding machine disclosed in the publication is to improve the stability of pressure control by eliminating the fluctuation of the controlled pressure at the time of pressure control, and [the injection molding machine] is equipped with a hydraulic drive source controlling the number of revolutions of a servomotor in fixed discharge type hydraulic pumps. At the same time, a relief circuit that relieves hydraulic oil discharged from the hydraulic pumps is specially arranged in order for the number of revolutions of the hydraulic pumps at the time of pressure control to become the number of revolutions for always being removed from an unstable region of the rotational resistance in the hydraulic pumps or greater.

However, conventional injection molding machine had to overcome the following problems.

First, when the injection molding machine is large in size, since a large servomotor is required in response to the maximum capacity of the injection molding machine, the servomotor itself becomes expensive, increasing the initial cost. Because the upsizing of the servomotor creates a larger capacity (greater electric current) for an auxiliary servo circuit (servo amplifier), ensuring resistance to electric power in the servo circuit and results in the gradual increase of the overall cost.

Secondly, since all operations in the injection molding machine is controlled by one servomotor, a region where the operation capability of the servomotor does not conform to each operational process of the injection molding machine easily occurs. Therefore, control tends to be unstable, which is disadvantageous from the standpoint of securing moldability and molding quality. At the same time, since the overload frequency becomes greater, which is disadvantageous from the standpoint of reliability and longevity, as well. In addition, as a measure against unstable regions where the number of revolutions of the servomotor becomes smaller, when the hydraulic oil to be discharged from the hydraulic pumps is relieved to the oil tank, if one unit of a large-sized servomotor is used, the energy waste becomes great, which is also disadvantageous from the standpoint of energy savings and running costs.

SUMMARY OF THE INVENTION

An objective of the present invention is to provide an injection molding machine that can eliminate the use of a large-sized drive motor, corresponding to the maximum capacity of the injection molding machine, even if the injection molding machine is large in size, that can reduce the overall initial cost including the servo circuit, for example, even when a servomotor is used as a drive motor.

Another objective of the present invention is to provide an injection molding machine where control is stabilized and moldability and molding quality are improved. At the same time, avoiding or reducing occurrence of overload enables improving the reliability and realization of longevity.

Another objective of the present invention is to provide an injection molding machine where a separate measure against an unstable region, where the number of revolutions of the drive motor becomes small, is unnecessary or reduceable, enabling improved energy savings and reduced running cost.

In order to accomplish these objectives, the present invention is characterized by the fact that, in an injection molding machine equipped with hydraulic pumps controlling the discharge flow rates by variably controlling the number of revolutions of the drive motor, and that drives hydraulic actuators by the hydraulic pumps; the injection molding machine is equipped with a hydraulic drive member having the multiple hydraulic pumps and a hydraulic oil supply circuit which jointly or independently supply the hydraulic oil to be discharged from the multiple hydraulic pumps to a selected hydraulic actuator out of the multiple hydraulic actuators.

DETAILED DESCRIPTION OF THE PREFERRED EMBODIMENT

Next, a preferred embodiment relating to the present invention is described in detailed based upon the drawings. Furthermore, the attached drawings do not specify the present invention, but are for the purpose of more easily understanding of the present invention. Regarding well-known portions, in order to prevent the invention from becoming ambiguous, detailed descriptions are omitted.

First, an entire construction of an injection molding machine M relating to this embodiment is described with reference to FIG. 1 to FIG. 4.

Figure 1:
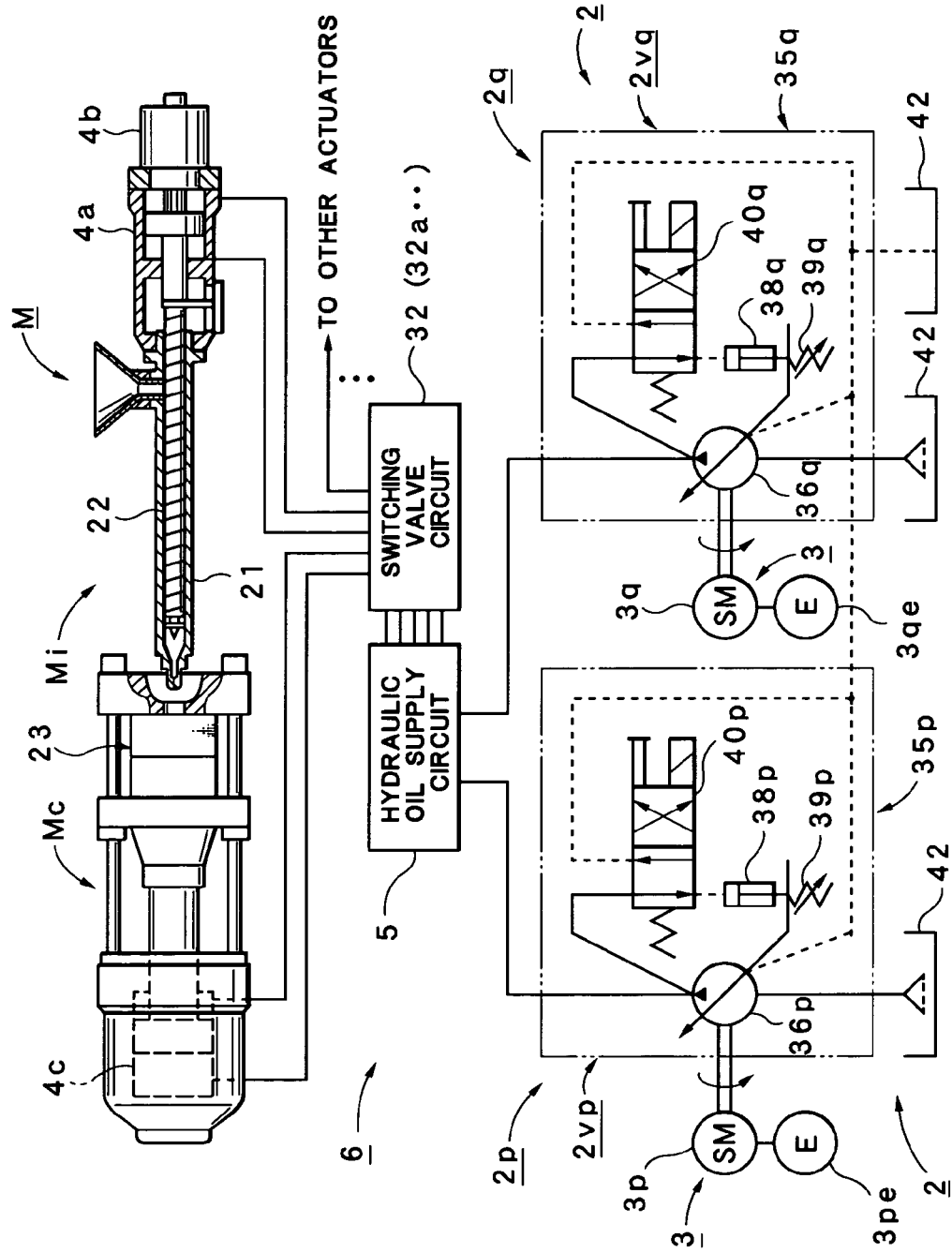
FIG. 1: A block diagram including a hydraulic drive member of an injection molding machine relating to a preferred embodiment of the present invention.

In FIG. 1, M is an injection molding machine, equipped with an injection unit Mi and a mold clamping device Mc. The injection molding machine M is equipped with an injecting cylinder 4a that moves a screw 22, which is internally contained in a heating cylinder 21 of the injection unit Mi, back and forth, and a measuring motor (oil motor) 4b that rotates the screw 22; At the same time, it is equipped with a mold clamping cylinder 4c that opens/closes and clamps a mold 23 in the mold clamping device Mc, and an ejecting cylinder 4d (FIG. 2) that ejects a molded article in the mold 23, as the hydraulic actuators (4a . . . ). Moreover, [the injection molding machine M] is equipped with an injection unit moving cylinder 4e (FIG. 2) that attaches or detaches a nozzle to/from the mold 23 by moving the injection unit Mi back and forth.

Meanwhile, 6 is a hydraulic drive member, equipped with two variable discharge type hydraulic pumps 2vp and 2vq (hydraulic pumps 2 and 2), a hydraulic oil supply circuit 5 and a switching valve circuit 32. One variable discharge type hydraulic pump 2vp is equipped with a pump 35p, and a servomotor 3p (drive motor 3) that revolves and drives this pump 35p. In this case, the servomotor 3p uses an alternating servomotor connected to a servo circuit (servo amplifier) 3pa; At the same time, a rotary encoder 3pe detecting the number of revolutions of this servomotor 3p is attached to the servomotor 3p. As described above, if the servomotor 3p is used as the drive motor 3, the injection molding machine M relating to this embodiment can be easily and reliably implemented, with the advantage that the effect by the injection molding machine M can be effectively obtained.

Moreover, the pump 35p internally contains a pump machine body 36p composed of a swash plate piston pump. Therefore, the pump 35p is equipped with a swash plate 37p (FIG. 2), and when a swash plate angle Rs, which becomes an angle of inclination of the swash plate 37p, becomes larger, the stroke of the pump piston in the pump machine body 36p becomes greater and the discharge flow rate increases. At the same time, if the swash plate angle Rs becomes smaller, the stroke of the pump piston becomes smaller and the discharge flow rate decreases. Therefore, setting the swash plate angle at a predetermined angle enables the setting of a fixed discharge flow rate Qo . . . . In addition, a control cylinder 38p and a return spring 39p are attached to the swash plate 37p. At the same time, the control cylinder 38p is connected to an outlet of the pump 35p (the pump machine body 36p) via a switching valve (an electromagnetic valve) 40p. With this design, the angle of the swash plate 37p is changeable by controlling the control cylinder 38p.

The other variable discharge type hydraulic pump 2vq is also constructed in a manner similar to the above variable discharge type hydraulic pump 2vp. In other words, the hydraulic pumps 2vp and 2vq have an identical rating. Furthermore, in the hydraulic pump 2vq, 35q indicates a pump, 3q is a servomotor (the drive motor 3), 36q is a pump machine body, 37q is a swash plate (FIG. 2), 38q is a control cylinder, 39q is a return spring and 40q is a switching valve (an electromagnetic valve). Therefore, if the number of revolutions of the servomotors 3p and 3q is variably controlled, the discharge flow rates and the discharge pressure of the hydraulic pumps 2vp and 2vq become respectively variable.

Figure 2:
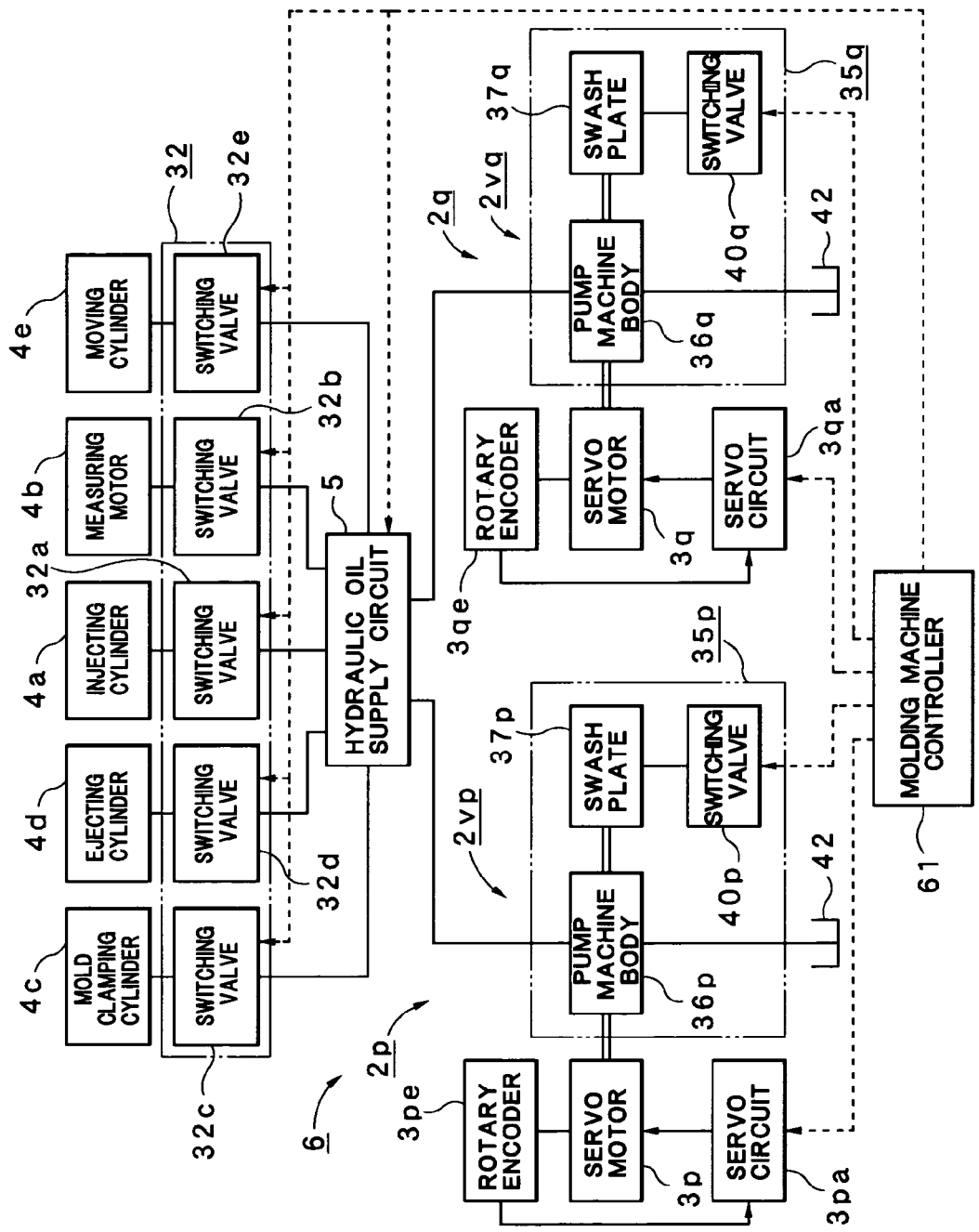
FIG. 2: A block circuit diagram of the hydraulic drive member in the injection molding member in FIG. 1.
Figure 3:
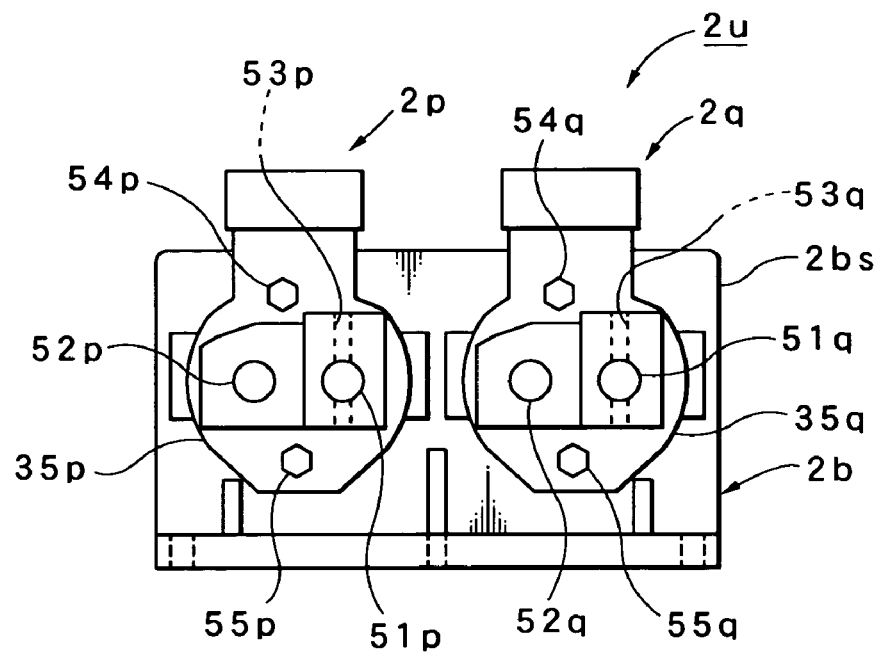
FIG. 3: An external front view of a pump unit equipped in the injection molding machine in FIG. 1.
Figure 4:
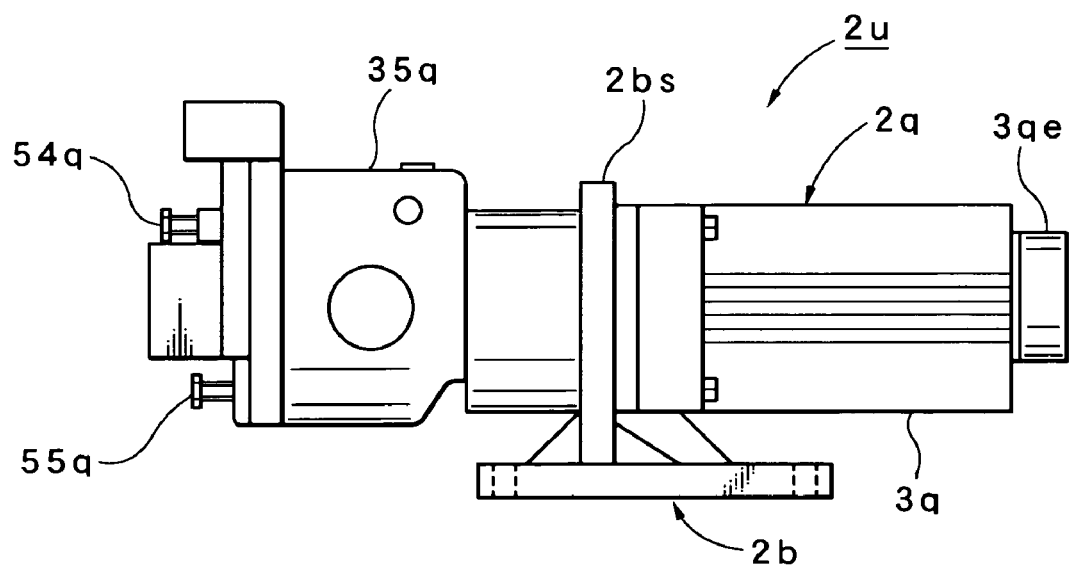
FIG. 4: An external side view of a pump unit equipped in the injection molding machine in FIG. 1.

The two hydraulic pumps 2vp and 2vq can be constructed as a pump unit 2u shown in FIG. 3 and FIG. 4. In the drawings, 2b is a pump support base, on which the two hydraulic pumps 2vp and 2vq are arranged in parallel. In this case, a support plate 2bs rises on the upper surface of the pump support base 2b, to which intermediate portions of the hydraulic pumps 2vp and 2vq are attached, respectively. In the drawing, symbols 51p and 51q are discharge ports of the hydraulic pumps 2vp and 2vq; 52p and 52q are inlets of the hydraulic pumps 2vp and 2vq; 53p and 53q are pressure sensor ports when attaching a pressure sensor to the hydraulic pumps 2vp and 2vq; 54p and 54q are larger capacity side discharge flow rate adjustment screws of the hydraulic pumps 2vp and 2vq; and 55p and 55q are smaller capacity side discharge flow rate adjustment screws of the hydraulic pumps 2vp and 2vq, respectively. Other than that, in FIG. 3 and FIG. 4, any members identical to those in FIG. 1 and FIG. 2 are marked with the same symbols, so the construction is clear.

As described above, if the two hydraulic pumps 2vp and 2vq are composed as pump unit 2u, which is integrated with the pump support base 2b, compactability and installation properties can be further improved. Because the hydraulic pumps 2vp . . . with the identical rating are used for the two hydraulic pumps 2vp and 2vq, it is sufficient to prepare two single-type hydraulic pumps 2vp . . . and low cost and compactability can be improved. Furthermore, the hydraulic pumps 2vp . . . with different ratings can be used for the two hydraulic pumps 2vp and 2vq. In this case, because the selection becomes diversified, matching properties and controllability can be improved.

On the other hand, inlets of the pumps 35p and 35q are connected to oil tanks 42 . . . . At the same time, the outlets of the pumps 35p and 35q are connected to the primary side of the hydraulic oil supply circuit 5, respectively. Moreover, the secondary side of the hydraulic oil supply circuit 5 is connected to the primary sides of the switching valve circuits 32, respectively, and in addition, the secondary sides of the switching valve circuits 32, as shown in FIG. 2, are connected to the injecting cylinder 4a, the measuring motor 4b, the mold clamping cylinder 4c, the ejecting cylinder 4d and the injection unit moving cylinder 4e comprising the hydraulic actuator in the injection molding machine M, respectively. Consequently, the switching valve circuit 32 is equipped with at least switching valves (electromagnetic valves) 32a, 32b, 32c, 32d and 32e connecting to the injecting cylinder 4a, the measuring motor 4b, the mold clamping cylinder 4c, the ejecting cylinder 4d and the injection unit moving cylinder 4e, respectively. Furthermore, each of the switching valves 32a, 32b, 32c, 32d and 32e is composed of necessary attaching hydraulic components including one, two or more valve components, and have at least switching functions relating to the supply, stoppage and discharge of the hydraulic oil to the injecting cylinder 4a, the measuring motor 4b, the mold clamping cylinder 4c, the ejecting cylinder 4d and the injection unit moving cylinder 4e, respectively.

Meanwhile, the hydraulic supply circuit 5 jointly or independently supplies the hydraulic oil to be discharged from the two hydraulic pumps 2vp and 2vq to each of the hydraulic actuator 4a . . . ; in other words, to the injecting cylinder 4a, the measuring motor 4b, the mold clamping cylinder 4c, the ejecting cylinder 4d and the injection unit moving cylinder 4e. Specific sample circuits of the hydraulic oil supply circuit 5 are shown in FIG. 5 to FIG. 10. FIG. 5 to FIG. 10 shows a basic sample circuit, respectively, and each sample circuit can be independently used jointly. Specific constructions and functions (operations) of each sample circuit are described later.

Moreover, 61 is a molding machine controller, to which servomotors 3p and 3q are connected via the servo circuits 3pa and 3qa, respectively. At the same time, rotary encoders 3pe and 3qe attached to the servomotors 3p and 3q are connected to the servo circuits 3pa and 3qa, respectively. In addition, switching valves 32a, 32b, 32c, 32d and 32e and switching valves 40p and 40q using an electromagnetic valve are connected to the molding machine controller, respectively.

The operation (function) of the injection molding machine M having this construction is explained hereafter, based on the sample circuits shown in FIG. 5 to FIG. 10.

Figure 5:
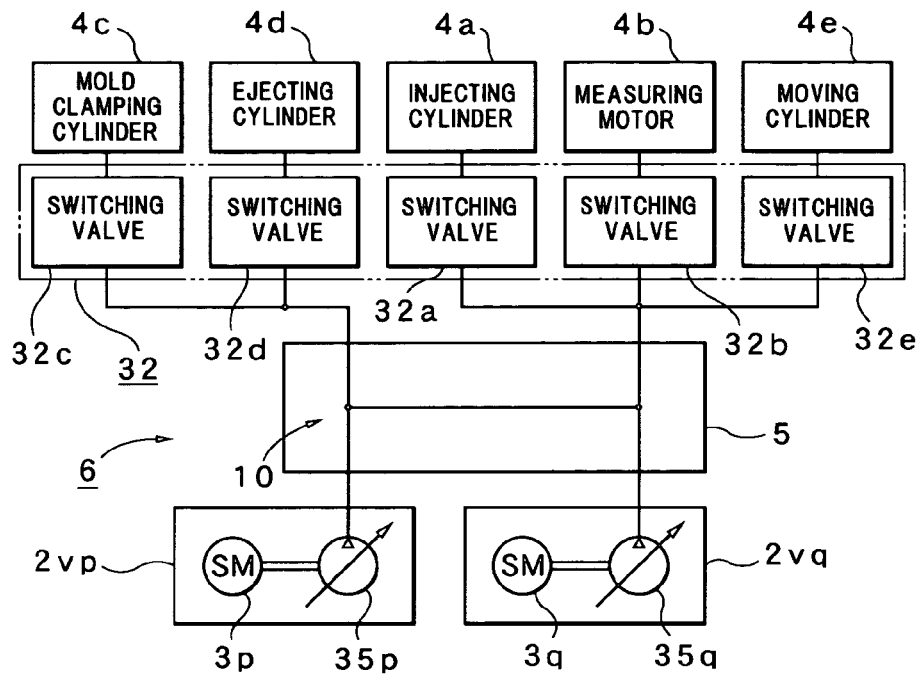
FIG. 5: A hydraulic circuit diagram showing a sample circuit of a hydraulic oil supply circuit equipped in the injection molding machine in FIG. 1.

The hydraulic oil supply circuit 5 shown in FIG. 5 shows a sample circuit where hydraulic oil to be discharged from the two hydraulic pumps 2vp and 2vq are jointly supplied to each of the cylinders 4a, 4c, 4d and 4e or the measuring motor 4b. Therefore, the hydraulic oil supply circuit 5 is equipped with a combining circuit 10 to combine the hydraulic oil to be discharged from the two units of the hydraulic pumps 2vp and 2vq. In this case, the flow rate instruction and the pressure instruction relating to the control are simultaneously provided to the two hydraulic pumps 2vp and 2vq. Since a large flow rate can always be secured in this sample circuit, it is preferable to use the large-seized injection molding machine M.

Furthermore, since a normal molding cycle proceeds in the following order:

a mold closing process by the mold clamping 4c (mold clamping process)→a forwarding process of the injection unit Mi by the injection unit moving cylinder 4e→a filling process and a pressure holding process by the injecting cylinder 4b→a measurement process by the measuring motor 4b→a moving backward process of the injection unit Mi by the injection unit movement cylinder 4c→a mold opening process by the mold clamping cylinder 4d→an ejecting process by the ejecting cylinder 4d;

the cylinders 4a, 4c, 4d, 4e and the measuring motor 4b corresponding to each operation process are connected to the secondary side of the hydraulic oil supply circuit 5 by selecting from the switching valves 32a . . .

Figure 6:
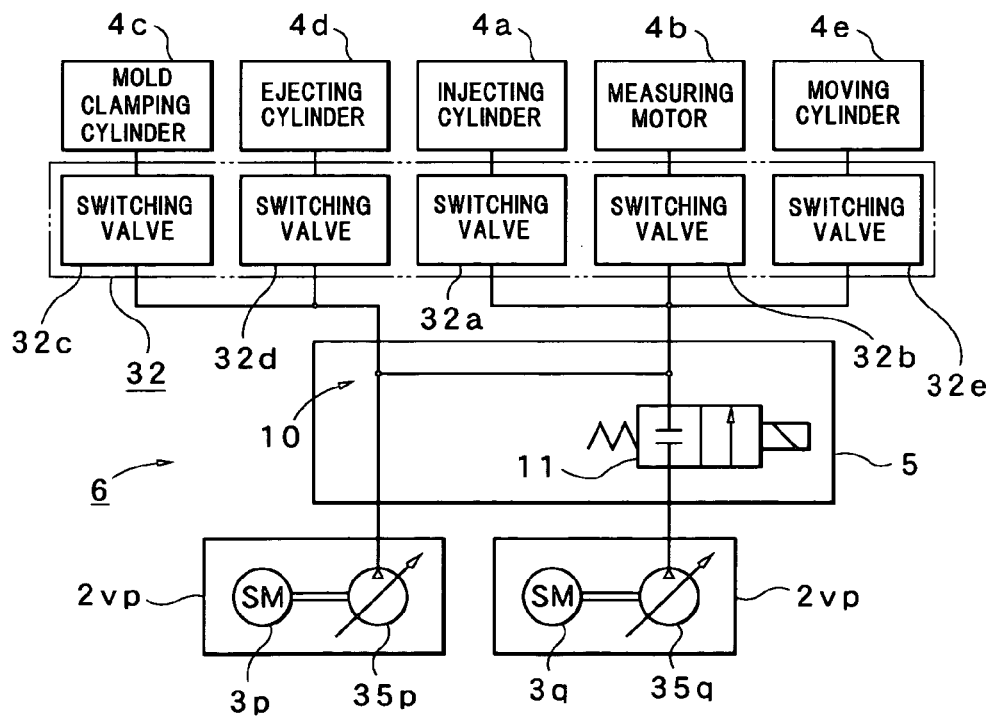
FIG. 6: Another hydraulic circuit diagram showing a sample circuit of the circuit equipped in the injection molding machine in FIG. 1.

The hydraulic oil supply circuit 5 shown in FIG. 6 shows a sample circuit where the single hydraulic pump 2vq can be combined or released relative to hydraulic pump 2vp by using combining circuit 10 and switching valve 11. In the sample circuit, only the single hydraulic pump 2vp can drive the cylinders 4a, 4c, 4d, 4e or the measuring motor 4b. At the same time, the other hydraulic pump 2vq can be combined as the occasion demands. Therefore, only in a high-speed filling process where a large flow rate is required, switching of the switching valve 11 to the open side and supplying hydraulic oil at a large flow rate enable the realization of the high-speed filling process. At the same time, in other operation process, when only switching of the switching valve 11 to the close side, each operation process can be performed only by the hydraulic pump 2vp. Furthermore, on this occasion, the hydraulic pump 2vq not in use is deactivated.

Figure 7:
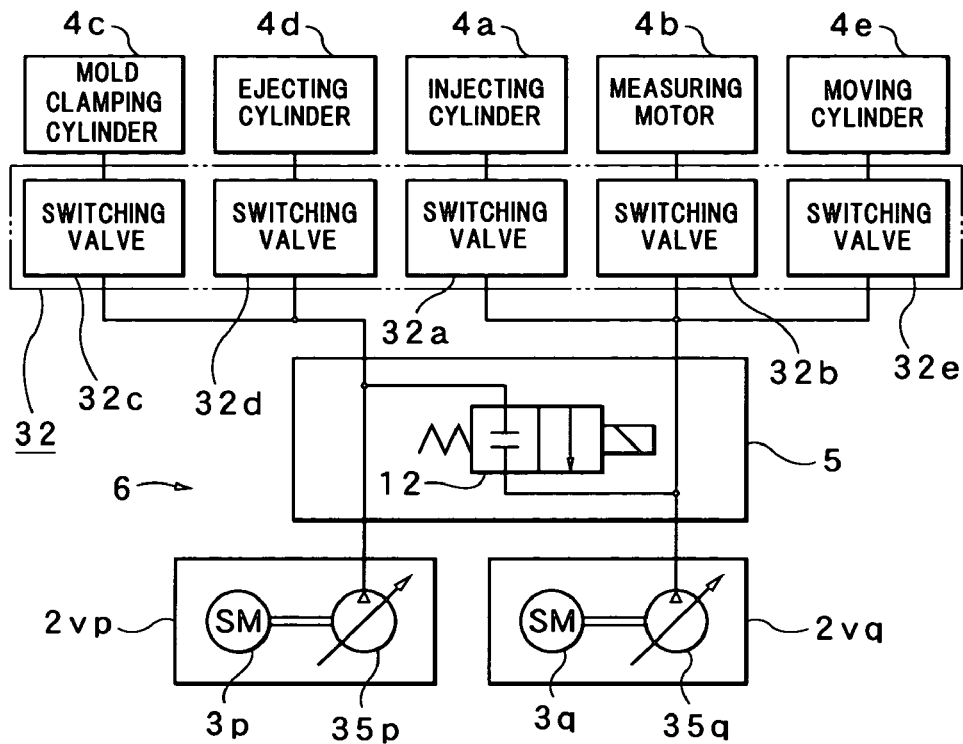
FIG. 7: Another hydraulic circuit diagram showing a sample circuit of the circuit equipped in the injection molding machine in FIG. 1.

The hydraulic oil supply circuit 5 shown in FIG. 7 shows a sample circuit where a switching valve 12 is used, the switching valve 12 is switched to the close side, and the hydraulic pump 2vp is used on the mold clamping device Mc (mold clamping cylinder 4c and the ejecting cylinder 4d) side, and, the other hydraulic pump 2vq is used on the injection unit Mi (the injecting cylinder 4a, the measuring motor 4b and the injection device moving cylinder 4e) side. At the same time, only in the high-speed filling process where a large flow rate is required, is the switching valve 12 switched to the open side and the hydraulic pumps 2vp and 2vq are combined. Furthermore, on this occasion, the hydraulic pump 2vp or 2vq not in use becomes deactivated.

In the sample circuit shown in FIG. 7, because the hydraulic pumps 2vp and 2vq can be independently used, respectively, the mold opening process by the hydraulic pump 2vp and the measurement process by the hydraulic pump 2vq can be simultaneously independently performed. In other words, if the above moving backward process where the injection unit Mi is moved backward in the state where the switching valve 12 is switched to the close side is completed, the hydraulic pumps 2vp and 2vq are simultaneously operated and the mold opening process and the measurement process can be simultaneously independently performed. Therefore, the sample circuit has the advantage that the cycle time period can be shortened.

Moreover, in the sample circuit of FIG. 7, if the switching valve 12 is switched to the open side, the configuration becomes the same as the combining circuit 10 shown in FIG. 5, enabling the circuit to be used for the large-sized injection molding machine M similar to the sample circuit shown in FIG. 5. However, the sample circuit of FIG. 7 is different from that of FIG. 5, and it is equipped with a switching valve 12, so in the pressure holding process where a large flow rate is not required, the switching valve 12 is switched to the close side and the pressure holding process can be performed by using only the hydraulic pump 2vq, which is advantageous because it can contribute to improved energy savings. Even when combing and using [hydraulic pumps], it is still possible to simultaneously independently perform the mold closing process and the measurement process.

Figure 8:
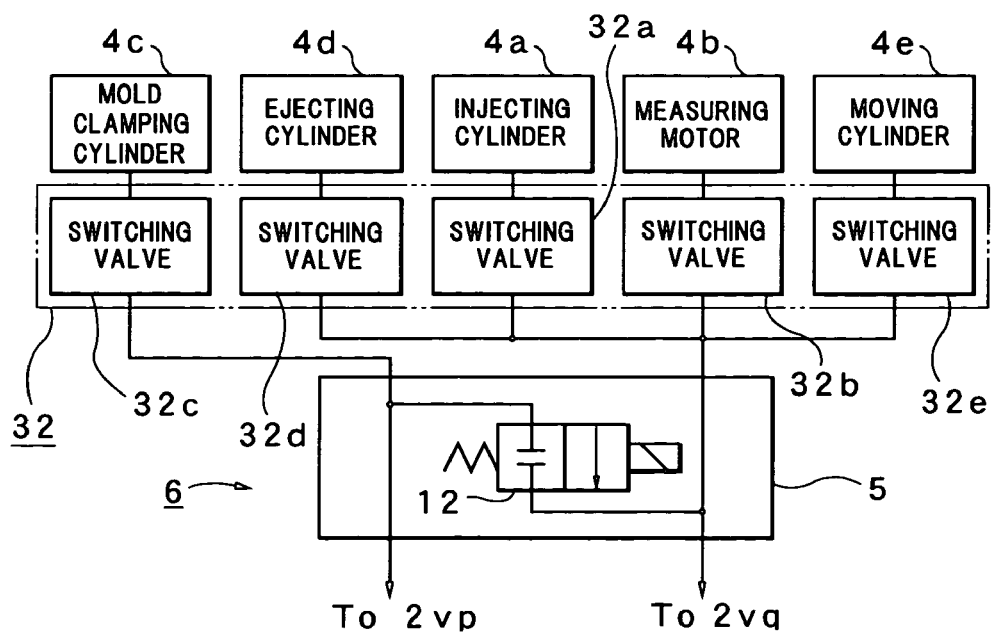
FIG. 8: Another hydraulic circuit diagram showing a sample circuit of the circuit equipped in the injection molding machine in FIG. 1.

The hydraulic oil supply circuit 5 shown in FIG. 8 is basically the same as the hydraulic oil supply circuit 5 shown in FIG. 7. However, the point where the connection mode at the secondary side of the hydraulic oil supply circuit 5 is modified is different. In the sample circuit shown in FIG. 8, the single hydraulic pump 2vp is normally used for the mold clamping cylinder 4c in the mold clamping unit Mc and the other hydraulic pump 2vq is used for the ejecting cylinder 4d in the mold clamping unit Mc, by switching the switching valve 12 to the close side, and is concurrently is used for the injecting cylinder 4a, the measuring motor 4b and the injection device moving cylinder 4e in the injection device Mi. Only in the high-speed filling process where a large flow rate becomes required, is the switching valve 12 switched to the open side and the hydraulic pumps 2vp and 2vq are combined. At this time the hydraulic pump 2vp not in use is deactivated.

Even in the sample circuit of FIG. 8, since the hydraulic pumps 2vp and 2vq can be independently used, respectively, the mold opening process by the single hydraulic pump 2vp and the ejecting process by the other hydraulic pump 2vq can be simultaneously independently performed. In other words, if the above moving backward process where the injection unit Mi is moved backward is completed in a state where the switching valve 12 is switched to the close side, the hydraulic pump 2vp and the hydraulic pump 2vq are simultaneously operated and the mold opening process and the ejecting process can be simultaneously independently performed; therefore, it is advantageous that the cycle time be shortened in this case, as well.

Even in the sample circuit of FIG. 8, if switching valve 12 is switched to the open side, the configuration becomes the same as that of the combining circuit 10 in FIG. 5, so [this circuit] can be used for the large-sized injection molding machine M similar to the sample circuit shown in FIG. 5. At the same time, in the pressure holding process where a large flow rate is not required, the switching valve 12 is switched to the close side and the pressure holding process can be performed by using only the hydraulic pump 2vp, advantageous because the circuit contributes to improved energy savings. Even when combining and using the hydraulic pumps as described above, it is still possible to simultaneously independently perform the above mold opening process and ejecting process.

Figure 9:
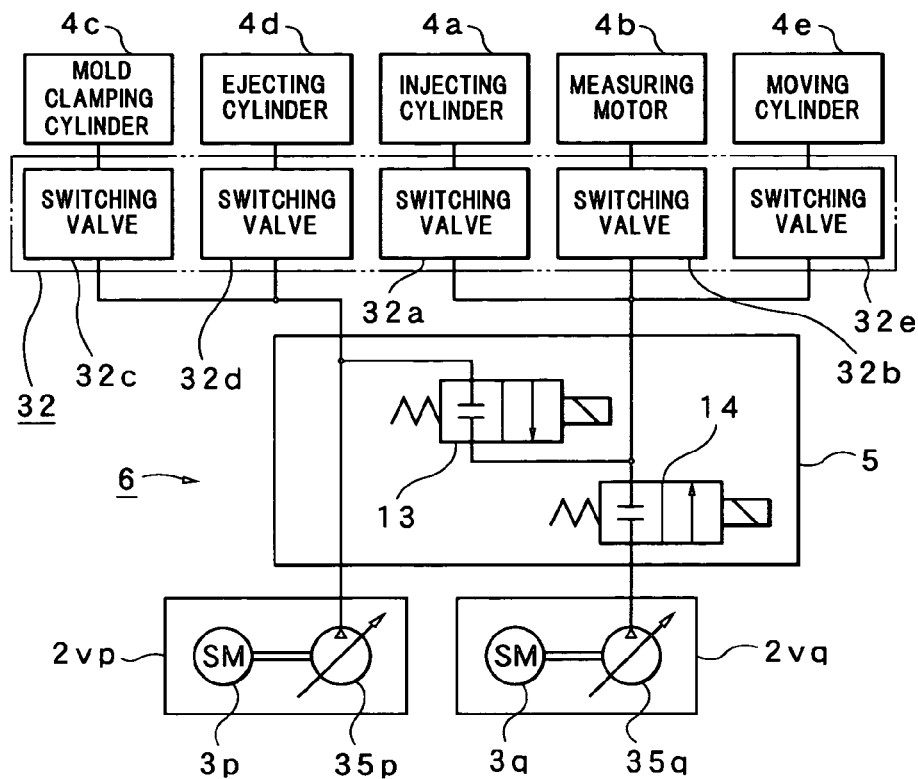
FIG. 9: Another hydraulic circuit diagram showing a sample circuit of the circuit equipped in the injection molding machine in FIG. 1.

Since the hydraulic oil supply circuit 5 shown in FIG. 9 uses two switching valves 13 and 14, this is a sample circuit where there is a degree of freedom when driving the cylinders 4a, 4c, 4d and 4e or the measuring motor 4b, such as independent operation of the hydraulic pumps 2vp and 2vq and the combined operation of the hydraulic pumps 2vp and 2vq, and the simultaneous operation of the mold opening process and the measurement process. Specifically, the mold closing process (mold clamping process) by the hydraulic pump 2vp in the state where both the switching valves 13 and 14 are switched to the close side, the forwarding process to forward the injection unit Mi by the hydraulic pump 2vp in the state where only the switching valve 13 is switched to the open side; the filling process by combining the hydraulic pumps 2vp and 2vq in the state where both the switching valves 13 and 14 are switched to the open side; the pressure holding process by the hydraulic pump 2vq in the state where only the switching valve 14 is switched to the open side; the measurement process by the hydraulic pump 2vp in the state where only the switching valve 13 is switched to the open side and the moving backward process to move the injection unit Mi backward; and the mold opening process by the hydraulic pump 2vp in the state where both the switching valves 13 and 14 are switched to the close side and the ejecting process can be performed, respectively. Even in this case, it is still possible to simultaneously independently perform the above mold opening process and measurement process.

Figure 10:
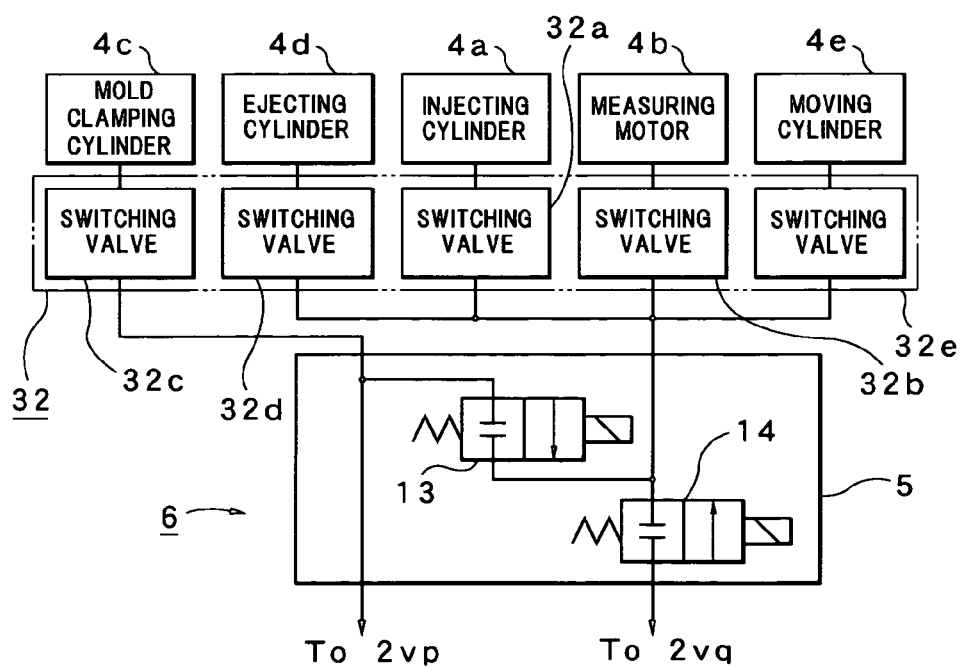
FIG. 10: Another hydraulic circuit diagram showing a sample circuit of the circuit equipped in the injection molding machine in FIG. 1.

The hydraulic oil supply circuit 5 shown in FIG. 10 is basically the same as that shown in FIG. 9. However, a point where the connection mode on the secondary side of the hydraulic oil supply circuit 5 is modified is different. Therefore, the sample circuit shown in FIG. 10 is also a circuit where the degree of freedom is high when driving the cylinders 4a, 4c, 4d and 4e and the measuring motor 4b, such as the independent operation of the hydraulic pumps 2vp and 2vq, the combined operation of the hydraulic pumps 2vp and 2vq, and the simultaneous operation of the mold opening process and the ejecting process. Specifically, the mold closing process (mold clamping process) by the hydraulic pump 2vp in the state where both the switching valves 13 and 14 are switched to the close side; the forwarding process to forward the injection unit Mi by the hydraulic pump 2vp in the state where only the switching valve 13 is switched to the open side; the filling process by combining the hydraulic pumps 2vp and 2vq in the state where both the switching valves 13 and 14 are switched to the open side; the pressure holding process by the hydraulic pump 2vq in the state where only the switching valve 14 is switched to the open side; the measurement process by the hydraulic pump 2vp in the state where only the switching valve 13 is switched to the open side and the moving backward process to move the injection unit Mi backward; the mold opening process by the hydraulic pump 2vp in the state where both the switching valves 13 and 14 are switched to the close side; and the ejecting process by the hydraulic pump 2vp in the state where only the switching valve 13 is switched to the open side can be performed, respectively. Even in this case, it is still possible to simultaneously independently perform the above mold opening process and ejecting process.

The basic sample circuits were described with reference to FIG. 5 to FIG. 10. As described above, each sample circuit can be independently used, and the sample circuits combined. As described, if the hydraulic oil supply circuit 5 is equipped with the combining circuit 10 where the hydraulic oil to be discharged from the two hydraulic pumps 2p... is combined and supplied to the hydraulic pressure actuator 4a..., or by being equipped with the switching valves 11, 12, 13 and 14 that individually supply the hydraulic oil to be discharged from the two hydraulic pumps 2p... to the hydraulic pressure actuator 4a..., the injection molding machine M relating to this embodiment can be easily and reliably implemented. At the same time, there are advantages that the control diverseness, control precision and the control accuracy can be further improved.

Therefore, according to the injection molding machine M relating to this embodiment, since the large-sized drive motor 3 corresponding to the maximum capability of the injection molding machine M becomes unnecessary even in the large-sized injection molding machine M, for example, even when using the servomotor 3p... as the drive motor 3, it is sufficient to use a low-cost servomotor 3, and the entire initial cost including the servo circuit 3pa... can be reduced. Moreover, because the region where the operation capacity of the drive motor 3 does not conform with each operation process in the injection molding machine M can be reduced, control can be stabilized, contributing to improved moldability and molded article quality. At the same time, avoiding or reducing overload contributes to improved reliability and longevity. In addition, miniaturization of the drive motor 3 (the servomotor 3p...) enables eliminating or reducing separate measures against the unstable region where the number of revolutions of the drive motor 3 becomes smaller, and it can contribute to improved energy savings and reduced running costs.

In this embodiment, the variable discharge type hydraulic pumps 2vp and 2vq where the fixed discharge flow rate Qo... can be set according to the change of swash plate angle Rs are used as hydraulic pumps 2p and 2q, so the fixed discharge flow rate Qo... corresponding to each operation process in the molding cycle based upon predetermined conditions can be pre-set by setting multiple operation modes where the multiple operation processes and the multiple fixed discharge flow rates Qo... are combined and selecting the operation mode at the time of molding enable switching of the discharge flow rate of the hydraulic pumps 2vp and 2vq to the fixed discharge flow rate Qo... corresponding to each operation process.

Hereafter, a method to set the operation mode is described. First, two fixed discharge flow rates Qo and Qs are set, and the single fixed discharge flow rate Qo is set to the standard discharge flow rate. Therefore, the swash plate angle Rs is set at a comparatively small angle (on the smaller capacity side). Meanwhile, the other fixed discharge flow rate Qs is set greater than the fixed discharge flow rate Qo, and specifically can be set to approximately double the fixed discharge flow rate Qo. Therefore, the swash plate angle Rs is set at a comparatively larger angle (at a larger capacity side). In other words, the other fixed discharge flow rate Qs hardly adversely affects the servomotors 3p and 3q if the time period is comparatively short (several seconds). However, when it is comparatively long, it is possible to set a discharge flow rate that may adversely affect the servomotors 3p and 3q.

As operational processes, the filling process and the pressure holding process can be applied. Furthermore, operation processes other than these will not be a selection subject for the operation mode, but are pre-set to the standard fixed discharge flow rate Qo. In the filling process, the fixed discharge flow rates Qo and Qs are set according to the injection speed (predetermined condition). Specifically, when the speed (injection speed) in the filling process is slower (Condition T1), for example, when it is 50 [%] or slower relative to the rating speed, the fixed discharge flow rate Qo to decrease the swash plate angel Rs is set. At the same time, when the speed in the filling process is fast (Condition T2), for example, when it is 100 [%] of the rating speed, the fixed discharge flow rate Qs to increase the swash plate angle Rs is set. Meanwhile, in the pressure holding process, the fixed discharge flow rates Qo and Qs can be set according to the time period of the pressure maintenance condition (predetermined condition). Specifically, when the time period of the pressure holding process is normal or long (Condition T3), the fixed discharge flow rate Qo is set. At the same time, when the time period of the pressure holding process is short, such as for several seconds (Condition T4), or when the pressure fluctuation when switching from the filling process to the pressure holding process is great, the fixed discharge flow rate Qs is set.

Because the above setting is possible, as an operational mode, for example, a first operation mode where the fixed discharge flow rate Qo is set both in the filling process and the pressure holding process; a second operation mode where the fixed discharge flow rate Qs is set in the filling process and the fixed discharge flow rate Qo is set in the pressure holding process; and a third operation mode where the fixed discharge flow rate Qs is set both in the filling process and pressure holding process can be established.

Therefore, for example, under the molding conditions, when the speed in the filling process (set speed) is slow, the first operation mode can be selected. Moreover, when the speed in the filling process is fast, the second operation mode can be selected. Because a great flow rate is required when the screw 22 is moved forward at high speed, the second operation mode becomes preferable. In addition, when the speed in the filling process is fast and the pressure fluctuation switching from the filling process to the pressure holding process is great, or when the time period of the pressure holding process is short, the third operation mode can be selected. There are a few cases which use the third operational mode. However, it is effective when high-speed filling is required and when the pressure on the pressure holding process is drastically reduced, for example, when the thickness of a molded article is extremely thin.

Meanwhile, each operational mode can be selected at the time of molding. In other words, according to the selection of optional operation mode, the fixed discharge flow rate Qo or Qs based on the selected operation mode is set by variable discharge type hydraulic pumps $2vp$ and $2vq$ in the filling process and the pressure holding process. At the same time, the standard fixed discharge flow rate Qo is set in the other processes. Moreover, each process including the filling process and the pressure holding process is controlled by variably controlling the number of revolutions of the servomotors $3p$ and $3q$.

As described above, the use of the hydraulic pumps $2vp$ . . . where at least two fixed discharge flow rate Qo and Qs can be set enables further segmentation of practical capacity of the hydraulic pumps $2vp$ . . . . Therefore, along with using the two hydraulic pumps $2vp$ and $2vq$, matching properties and controllability can be further improved. Moreover, because the variable discharge type hydraulic pumps $2vp$ . . . where the fixed discharge flow rates Qo . . . by the change of the swash plate angle Rs . . . are used, the two fixed discharge flow rates Qo . . . can be easily and reliably obtained.

As described above, the best embodiment was described in detail. However, the present invention is not limited to this embodiment, but can be optionally modified without departing from the scope of the invention in the detailed construction (circuit construction), circuit components and the number. At the same time, these can be added or deleted as the occasion demands.

For example, the servomotors $3p$ . . . were illustrated as the drive motor 3 to control the discharge flow rate of the hydraulic pump 2 by variously controlling the number of revolutions. However, another drive motors 3 . . . having similar functions can be used. Moreover, the variable discharge types $2vp$ . . . where multiple discharge flow rates Qo . . . can be set according to the change of the swash plate angle Rs were illustrated as the hydraulic pumps $2p$ . . . . However, this does not eliminate the use of other hydraulic pumps $2p$ . . . such as a fixed discharge type hydraulic pump. In addition, the case where the two hydraulic pumps $2p$ . . . ($2vp$ . . . ) were used was described. However, [the present invention] can be similarly implemented even when using 3 units or more. Meanwhile, a sample circuit that is equipped with the combining circuit 10 that combines and supplies the hydraulic oil to be discharged from the two (multiple) hydraulic pumps $2p$ . . . to the hydraulic actuators $4a$ . . . , or with the switching valves 11 . . . that individually supplies the hydraulic oil to be discharged from the two (multiple) hydraulic pumps $2p$ . . . to the hydraulic actuators $4a$ . . . was described as the construction of the hydraulic oil supply circuit 5. However, this does not eliminate circuit construction other than those illustrated.

What is claimed is:

1. An injection molding machine comprising:
   a plurality of hydraulic actuators, including:
      an injecting cylinder that moves back and forth a screw built in a heating cylinder of an injection unit;
      a measuring motor that rotates the screw;
      a mold clamping cylinder that opens or closes a mold and clamps the mold in a mold clamping unit;
      an ejecting cylinder that ejects a molded article formed in the mold; and
      an injection unit moving cylinder that moves the injection unit back and forth and attaches a nozzle to the mold or detaches the nozzle from the mold;
   a hydraulic drive member for driving the hydraulic actuators, the hydraulic drive member including:
      a plurality of hydraulic pumps, wherein the hydraulic pumps are variable discharge type hydraulic pumps where each of at least two different fixed discharge flow rates for each of the hydraulic pumps are preset for a corresponding one of a plurality of operation processes in a molding cycle; and
      a hydraulic oil supply circuit having one or more switching valves, the one or more switching valves being structurally configured to selectively merge and supply hydraulic oil discharged from the plurality of the hydraulic pumps or individually supply the hydraulic oil discharged from the plurality of the hydraulic pumps to a selected one or more of the hydraulic actuators in accordance with each of the plurality of operation processes of a molding cycle from the hydraulic actuators;
   wherein the hydraulic drive member structurally configured to select only one of the at least two different fixed discharge flow rates of the hydraulic pumps in each of the plurality of operation processes of the molding cycle and to variably control a number of revolutions of the servomotor, thereby controlling each of the plurality of operation processes in the molding cycle.

2. The injection molding machine according to claim 1, wherein the hydraulic pumps are constructed as a pump unit integrated with a pump support base.

3. The injection molding machine according to claim 1, wherein the at least two different fixed discharge flow rates are set according to the change of a swash plate angle.

4. The injection molding machine according to claim 1, wherein the one or more switching valves are structurally configure to have switching functions relating to the supply, stoppage and discharge of the hydraulic oil to each hydraulic actuator.

5. The injection molding machine according to claim 1, wherein the one or more switching valves receive the hydraulic oil discharged from only one of the plurality of hydraulic pumps.

6. The injection molding machine according to claim 5, wherein there are at least two switching valves and the at least two switching valves receive the hydraulic oil discharged from the same one of the plurality of hyduaulic pumps.

* * * * *